United States Patent [19]
Tracy

[11] Patent Number: 5,465,193
[45] Date of Patent: Nov. 7, 1995

[54] FRONT LIGHT GUIDE FOR LIQUID CRYSTAL DEVICE WITH STAIRSTEP ELEMENT WHICH EMITS LIGHT

[75] Inventor: James L. Tracy, Margate, Fla.

[73] Assignee: Motorola, Inc., Schaumburg, Ill.

[21] Appl. No.: 82,649

[22] Filed: Jun. 28, 1993

[51] Int. Cl.⁶ .................................................. G02F 1/1335
[52] U.S. Cl. .................. 362/31; 362/32; 359/49; 359/42
[58] Field of Search ...................... 359/42, 48, 49, 359/50, 40; 362/26, 31, 23, 24, 31, 330, 32; 385/146

[56] References Cited

U.S. PATENT DOCUMENTS

| | | | |
|---|---|---|---|
| 4,141,058 | 2/1979 | Mizohata et al. | 362/32 |
| 4,212,048 | 7/1980 | Castleberry | 362/19 |
| 4,626,074 | 12/1986 | Crossland et al. | 359/50 |
| 4,630,895 | 12/1986 | Abdala, Jr. et al. | 359/49 |
| 4,737,896 | 4/1988 | Mochizuki et al. | 359/48 |
| 4,929,062 | 5/1990 | Guzik et al. | 359/48 |
| 5,075,824 | 12/1991 | Tan | 359/48 |
| 5,101,325 | 3/1992 | Davenport et al. | 362/31 |
| 5,255,162 | 10/1993 | Kawamoto | 359/49 |
| 5,257,168 | 10/1993 | Davenport et al. | 362/32 |

OTHER PUBLICATIONS

A. M. Blumfield and S. E. Jones, "Parts That Glow", Machine Design, Oct. 29, 1959.
Scott Dill and T. C. Kok, "Light Pipe with Integral Alert Lens", Motorola Technical Developments, Oct. 1990, vol. 11, 106.
Todd W. Roshitsh, "Low–Profile Retainer/Mount and Lightpipe", Motorola Technical Developments, Oct. 1990, vol. 11, 60–62.

*Primary Examiner*—William L. Sikes
*Assistant Examiner*—Kenneth Parker
*Attorney, Agent, or Firm*—Pablo Meles; John H. Moore; Daniel K. Nichols

[57] ABSTRACT

A front lighted liquid crystal display assembly (10) comprises a liquid crystal display (22) and a substantially clear lens (11) mounted above the liquid crystal display. The clear lens has a portion with a stair step configuration (18). The assembly further comprises a light pipe (14) integrally coupled to the substantially clear lens for substantially transmitting a light (12) through the light pipe and into and through the stair step configuration.

17 Claims, 2 Drawing Sheets

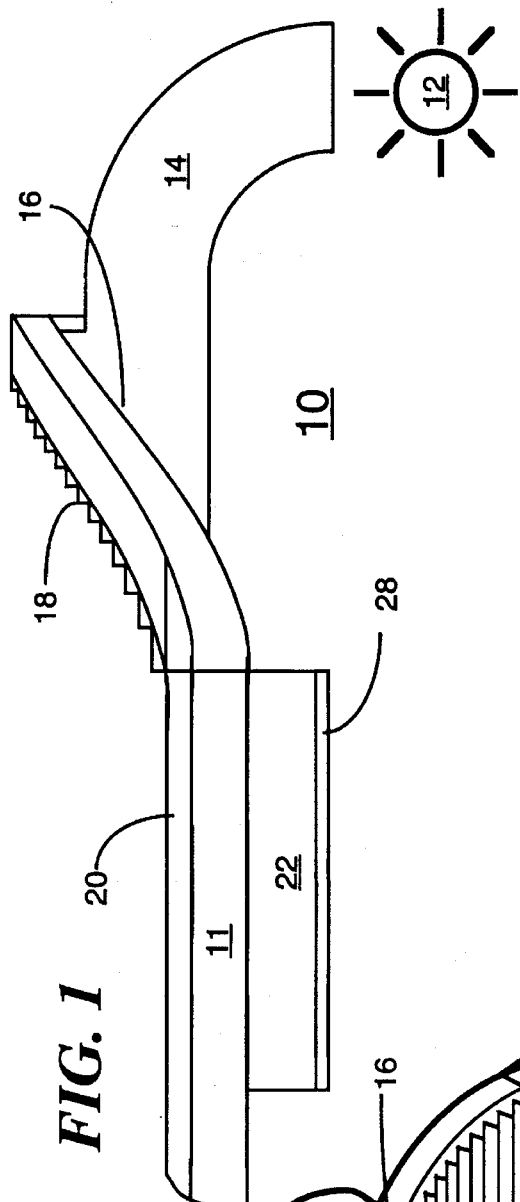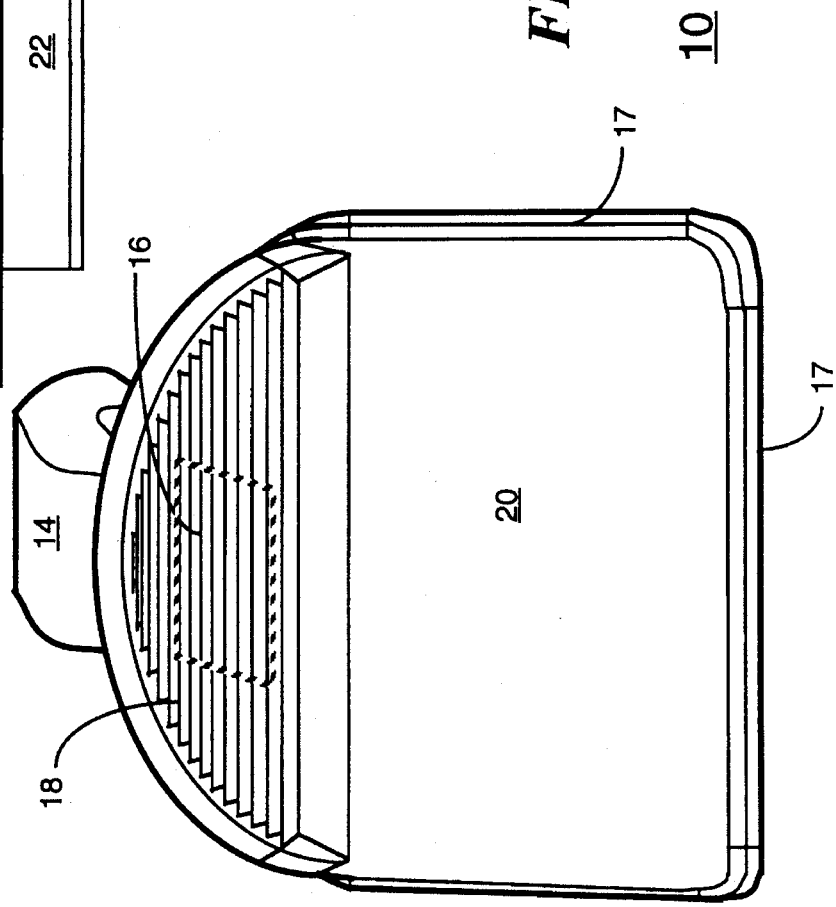

5,465,193

FRONT LIGHT GUIDE FOR LIQUID CRYSTAL DEVICE WITH STAIRSTEP ELEMENT WHICH EMITS LIGHT

TECHNICAL FIELD

This invention relates generally to a front lighted illumination lens and in particular, to a front lighted and flood lighted illumination lens using a light pipe.

BACKGROUND

Back lighting is the conventional method of lighting liquid crystal displays. Many backlit liquid crystal displays require a multiple number of light emitting diodes (LEDs) to provide a sufficient amount of light across the display and potentially other parts of a product. For instance, a version of Motorola's Silverlink™ CT-2 cordless phone handset presently uses discretely placed LEDs in both a liquid crystal display area to specifically illuminate the liquid crystal display area and between keys within a keypad to back light surrounding keys in a translucent keypad area. Use of many LEDs can cause an undue amount of current drain in portable electronic products. Additionally, backlit displays typically require intricate light pipes to provide further flooding across the plane of the liquid crystal displays. And, a protective lens that covers the liquid crystal display only has a limited purpose of protecting the liquid crystal display. Thus, there are redundant parts in conventional illuminated displays. Therefore, a need exists for a front lighted display that can also provided flood lighting and can reduce the number of parts required for lighting a liquid crystal display and other parts of a product such as a keypad.

SUMMARY OF THE INVENTION

A front lighted lens using a remote light source comprises a substantially clear lens having at least a portion of the lens serving as a light pipe and at least a portion of the lens having at least one primary substantially perpendicular plane. The lens is front lighted using the light pipe in the lens and the remote light source. A predetermined area is flood lighted using at least one of the primary substantially perpendicular planes and the remote light source.

BRIEF DESCRIPTION OF THE DRAWINGS

FIG. 1 is a side view of a front lighted liquid crystal display assembly in accordance with the present invention.

FIG. 2 is a perspective view of a front lighted liquid crystal display assembly in accordance with the present invention.

DETAILED DESCRIPTION OF THE PREFERRED EMBODIMENT

Figure 3:
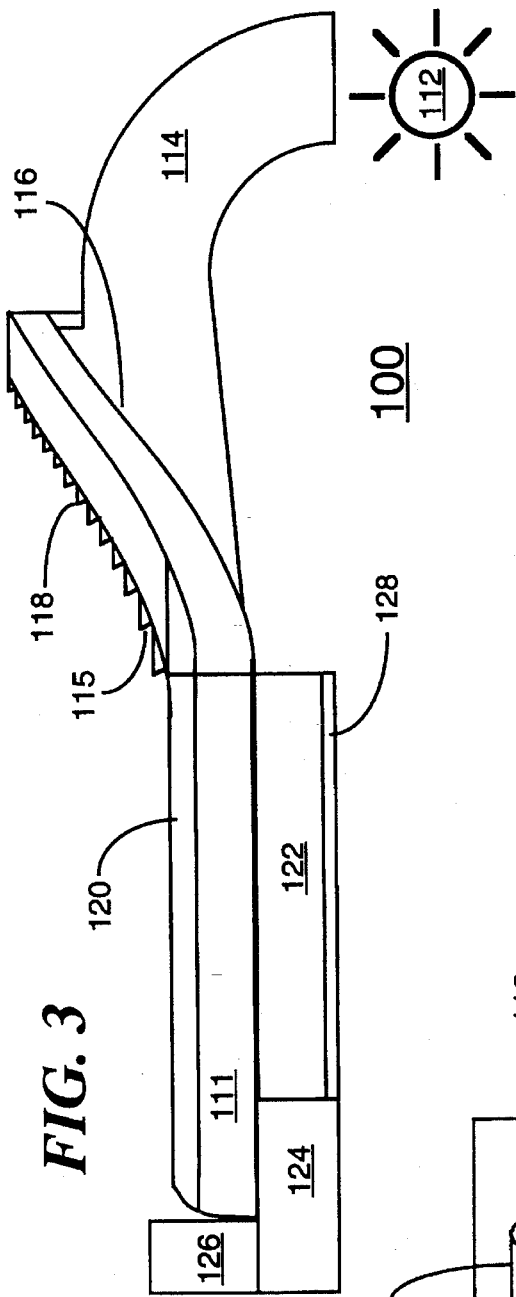
FIG. 3 is a side view of a communication product having a front lighted liquid crystal display assembly in accordance with the present invention.

Referring to FIG. 1, there is shown a side view of a front lighted liquid crystal display assembly 10 in accordance with the present invention. Generally, the front lighted lens assembly 10 uses a remote light source 12 having a substantially clear lens 11 (preferably made of a clear plastic material such as Plexiglas, polycarbonate, or acrylic) having at least a portion of the lens serving as a light pipe and at least a portion of the lens having at least one primary substantially perpendicular plane (18). This front lighted lens is primarily used to front light and flood light a liquid crystal display and/or other targeted areas of a portable electronic product. Of course, uses of the lens other than in portable electronic products are contemplated within the present invention as well, such as in front lighting and flood lighting a film reader lens. The entire lens or a portion of the lens can serve as a light pipe. The at least one primary substantially perpendicular plane can range from being one plane to a series of planes preferably in a stair step configuration. Further, the substantially perpendicular plane preferably has an undercut between the ranges of 0 and 15 degrees from vertical although the undercut can be as large as 35 degrees and still be considered a "substantially perpendicular plane" in accordance with the present invention. Thus, the assembly has a means for front lighting the lens using the light pipe in the lens and the remote light source and a means for flood lighting a predetermined area using at least one primary substantially perpendicular plane and the remote light source. The predetermined area or targeted area for flood lighting can be the lens itself or another part of a product the predetermined area substantially being a function of the degree of the aforementioned undercut in the substantially perpendicular plane.

Once again, the front lighted liquid crystal display of FIG. 1 preferably comprises a liquid crystal display 22 having a substantially clear lens 11 mounted above the liquid crystal display 22. The clear lens 11 preferably has a portion 18 forming a stair step configuration. Additionally, a light pipe 14 is integrally coupled to the substantially clear lens 11 for substantially transmitting a light from a light source 12 through the light pipe and into and through the stair step configuration 18, wherein a substantial portion of the light exits the stair step configuration. In other words, the light transmits through the light pipe and onto the faces of the stair step configuration, whereby the light is flooded through the ambient environment and onto a remote target. The remainder of the light not exiting the stair steps is trapped within a remaining flat lens portion 20 creating a glow serving as a front light source for the liquid crystal display 22. The light pipe is preferably curved and configured to have a radius approximately twice the diameter of the light pipe, but other shapes are within contemplation of the present invention to suit the particular dimensional constraints or designs of a given product. The light source for the light pipe 14 is preferably placed at an open end of the light pipe. The light source 12 is preferably at least one light emitting diode or other low current device, but other sources of light such as an incandescent light can be used and is contemplated to be within the scope of the present invention.

Referring to FIGS. 1 and 2, the light pipe 14 preferably has a flaring end 16 integrally coupled to the stair step configuration 18 of the lens 11. Additionally, the lens 11 has the remaining portion 20 that is preferably substantially flat and laid flush against the top surface of the liquid crystal display 22. The lens 11 channels a substantial portion of the light not exiting the light pipe through an perimeter area 17 creating a glowing effect around the perimeter of the lens 11. Additional lighting is provided by the flooding or spreading effect of the stair step configuration 18. The stair stepped configuration 18 is preferably positioned to rise above the plane of the remaining portion 20 of the lens 11, so as to provide a suitable spread of "flood" lighting over the portion 20. Optionally, the stair stepped configuration 18 can be configured to provide a suitable spread of "flood" lighting over a keypad area 126 in a product as will be discussed with reference to FIGS. 3 and 4. Finally, the liquid crystal display 22 preferably includes a reflective film 28 applied to the backside or underside of the liquid crystal display 22 to enhance front lighting efficiency for the liquid crystal display.

Figure 4:
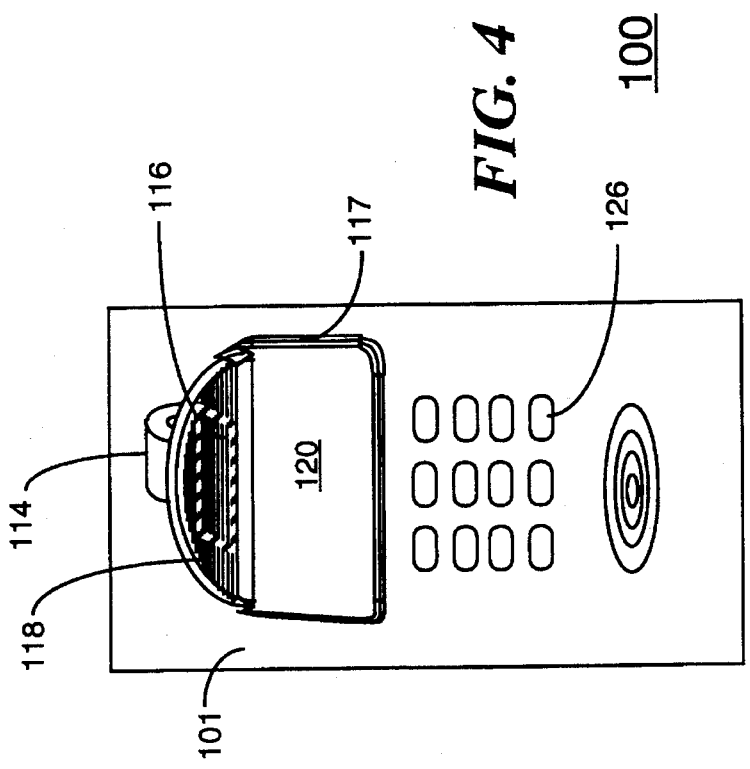
FIG. 4 is a perspective view of a communication product having a front lighted liquid crystal display assembly in accordance with the present invention.

Referring to FIGS. 3 and 4, the front lighted liquid crystal display assembly 100 preferably resides in a portable electronic product such as a television remote control or a portable communication product such as a two-way radio, cellular phone, cordless telephone, or pager having a housing 101. The assembly 100 within the portable electronic device preferably comprises a liquid crystal display 122 having a substantially clear lens 111 mounted above the liquid crystal display 122. The clear lens 111 preferably has a portion 118 forming a stair step configuration. The stair step configuration 118 ideally has an undercut 115 in the range between 0 and 35 degrees from vertical in each of the steps. The stair step configuration is undercut to direct the flood lighting towards a predetermined area or target area such as a the liquid crystal display or a keypad. Additionally, a light pipe 114 is integrally coupled to the substantially clear lens 111 for substantially transmitting a light from a light source 112 through the light pipe and into and through the stair step configuration 118, wherein a substantial portion of the light exits the stair step configuration. As before, the light source for the light pipe 114 is preferably placed at an open end of the light pipe. The light source 112 is preferably at least one light emitting diode or other low current device, but other sources of light such as an incandescent light can be used and is contemplated to be within the scope of the present invention.

The light pipe 114 preferably has a flaring end 116 integrally coupled to the stair step configuration 118 of the lens 111. The flaring end 116 preferably has a trumpeted flanged out shape that allows for a substantial spread or flood of light across a targeted area such as a remaining portion 120 of the lens 111 or a keypad area 126 above the keypad circuitry area 124. The remaining portion 120 is preferably substantially flat and laid flush against the top surface of the liquid crystal display 122. The lens 111 channels a substantial portion of the light not exiting the light pipe through a perimeter area 117, creating a glowing effect around the perimeter of the lens 111. Additional lighting is provided by the flooding or spreading effect of the stair step configuration 118. The stair stepped configuration 118 is preferably positioned to rise above the plane of the remaining portion 120 of the lens 111, so as to provide a suitable spread of "flood" lighting over the portion 120. Optionally, the stair stepped configuration 118 can be configured to direct a suitable spread of "flood" lighting over a keypad area 126 in addition to the portion 120. How the flood lighting is targeted is primarily a function of the height the stair step rises above the remaining portion 120 of the lens 111 and the degree of the undercut. Finally, the liquid crystal display 122 preferably includes a reflective film 128 applied to the backside or underside of the liquid crystal display 122 to enhance front lighting efficiency.

What is claimed is:

1. A front lit display lens using a remote light source, comprising:

a substantially clear light guide having a flat portion, at least a portion of the light guide serving as a light pipe and at least a portion of the light guide having at least one optical element having a profile including a series of steps, each step having a top surface and a side surface; and means for guiding light to the lens through the light pipe in the lens from the remote light source, wherein the flat portion is placed over a display and front illuminates the display and said optical element emits light from the surfaces which provides illumination in the vicinity of the display.

2. The front lit lens of claim 1, wherein the substantially clear light guide has the optical element integrally formed, and wherein the light emitted from said optical element exits a side surface towards a predetermined targeted area of the flat portion of the light guide.

3. A front lit liquid crystal display assembly, the assembly comprising:

a liquid crystal display;

a substantially clear light guide mounted above the liquid crystal display, the clear light guide having a flat portion and a portion having an optical element having a profile including a series of steps, each step having a top surface and a side surface;

a light pipe coupled to the substantially clear light guide for substantially transmitting light through the light pipe and into and through the optical element and flat portion, wherein a substantial portion of the light exits the optical element side surfaces providing illumination in a region near the liquid crystal display, and light is emitted from a surface of the flat portion providing illumination for the liquid crystal display.

4. The assembly of claim 3, wherein the assembly further comprises a light source at one end of the light pipe.

5. The assembly of claim 4, wherein the assembly further comprises a light pipe having a flaring end coupled to said optical element.

6. The assembly of claim 3, wherein the substantially clear light guide is comprised of a clear plastic material.

7. The assembly of claim 3, wherein each step of the optical element is arranged and constructed to form an angle between the top surface and side surface in the range between 0 and 35 degrees for providing and directing light towards a predetermined area.

8. The assembly of claim 3, wherein the series of steps rises above the plane of flat portion of the clear light guide.

9. A portable electronic device having a front lit liquid crystal display assembly, the assembly comprising:

a liquid crystal display;

a substantially clear light guide having a flat portion that is flush mounted above the liquid crystal display, the clear light guide also having an optical element having a profile including a series of steps, each step having a top surface and a side surface;

a light pipe coupled to the substantially clear light guide for transmitting a light source through the pipe and into and through the side surfaces of the series of steps, wherein the light exits the series of steps providing illumination on the portable device in a region near the display, and light exits the flat portion providing illumination to the liquid crystal display.

10. The portable electronic device of claim 9, wherein the assembly further comprises a light source at one end of the light pipe.

11. The portable electronic device of claim 10, wherein the assembly further comprises a light pipe having a flaring end coupled to said optical element.

12. The portable electronic device of claim 9, wherein the substantially clear light guide is comprised of a clear plastic material.

13. The portable electronic device of claim 9, wherein each step of the optical element is arranged and constructed to form an angle between the top surface and side surface in the range between 0 and 35 degrees for providing and directing light towards a predetermined area.

14. The portable electronic device of claim 9, wherein the portable electronic device comprises a handheld portable radio.

15. The portable electronic device of claim 9, wherein the portable electronic device comprises a handheld remote control device.

16. A front lit liquid crystal display assembly, the assembly comprising:

a liquid crystal display;

a substantially clear light guide having a flat portion that is flush mounted above the liquid crystal display, the clear light guide having a portion having an optical element having a profile including a series of steps, each step having a top surface and a side surface rising above a remaining portion of the clear light guide;

a light source for transmitting light through the clear light guide;

a curved light pipe integrally coupled to the substantially clear light guide for transmitting light through the light pipe and into and through the optical element, wherein a substantial portion of the light exits the optical element from a flanged flaring end of the light pipe and some of the light glows around the perimeter of the of the flat portion of the light guide.

17. The assembly of claim 16, wherein the liquid crystal display has a reflective film applied to the backside of the liquid crystal display.

* * * * *